United States Patent [19]

Cavazza et al.

[11] Patent Number: 4,752,958
[45] Date of Patent: Jun. 21, 1988

[54] DEVICE FOR SPEAKER'S VERIFICATION

[75] Inventors: Michele Cavazza, Turin; Alberto Ciaramella, Rosta, both of Italy

[73] Assignee: Cselt-Centro Studi e Laboratori Telecomunicazioni S.p.A., Turin, Italy

[21] Appl. No.: 682,597

[22] Filed: Dec. 17, 1984

[30] Foreign Application Priority Data

Dec. 19, 1983 [IT] Italy ................................ 68320 A/83

[51] Int. Cl.$^4$ .............................................. G10L 5/00
[52] U.S. Cl. ..................................................... 381/42
[58] Field of Search ............................. 381/42, 43, 46

[56] References Cited

U.S. PATENT DOCUMENTS

| | | | |
|---|---|---|---|
| 4,084,245 | 4/1978 | Bunge | 381/42 |
| 4,292,471 | 9/1981 | Kuhn | 381/42 |
| 4,535,473 | 8/1985 | Sakata | 381/46 |

OTHER PUBLICATIONS

Article, "An Algorithm for Determining the Endpoints of Isolated Utterances" (Bell System Technical Journal, Feb. 1975).
Article, "Dynamic Programming Algorithm Optimization for Spoken Word Recognition", IEEE Transactions . . . , Feb. 1978.
Article, "Considerations in Applying Clustering Techniques . . . " (Journ. Acoustical Soc. of America, 1979).
Article, "A Low Cost Speaker Verification Device", M. H. Kuhn–1980.

Primary Examiner—Emanuel S. Kemeny
Attorney, Agent, or Firm—Karl F. Ross; Herbert Dubno

[57] ABSTRACT

The device obtains several characteristic parameters from a standard sentence said by a speaker and compares them with average parameters of the same speaker stored in an internal memory and previously calculated. According to the comparison, it obtains a probability value that the sentence spoken belongs to that speaker and compares the value with a threshold normalized to the average parameter variance by a threshold calculation circuit. If the threshold is overcome, the device considers the speaker verified. A circuit determines the real instants of sentence beginning and end using a noise-adaptive threshold in order to limit between these two instants the time interval over which characteristic parameters are to be calculated. A circuit aligns as to time the characteristic parameters just calculated to the parameters of a reference sentence, obtaining standard lengths of the sounds composing the sentence spoken. A variable probability threshold is controlled by the standard deviations of the histogram of the average of the characteristic parameter vectors.

12 Claims, 8 Drawing Sheets

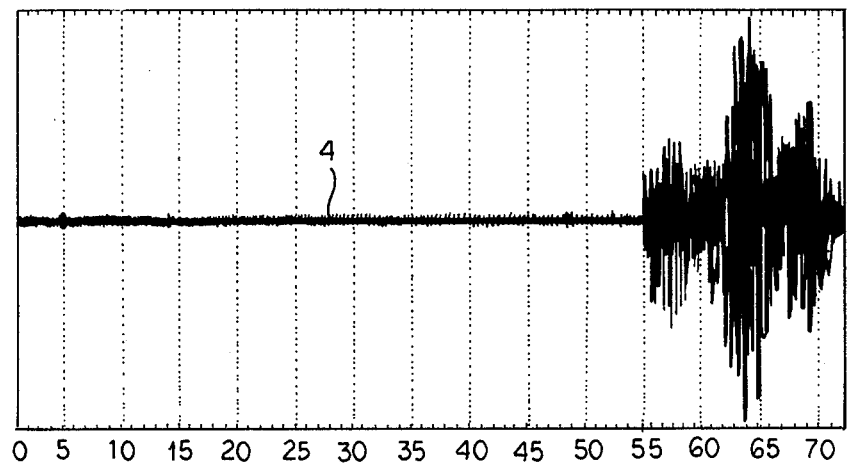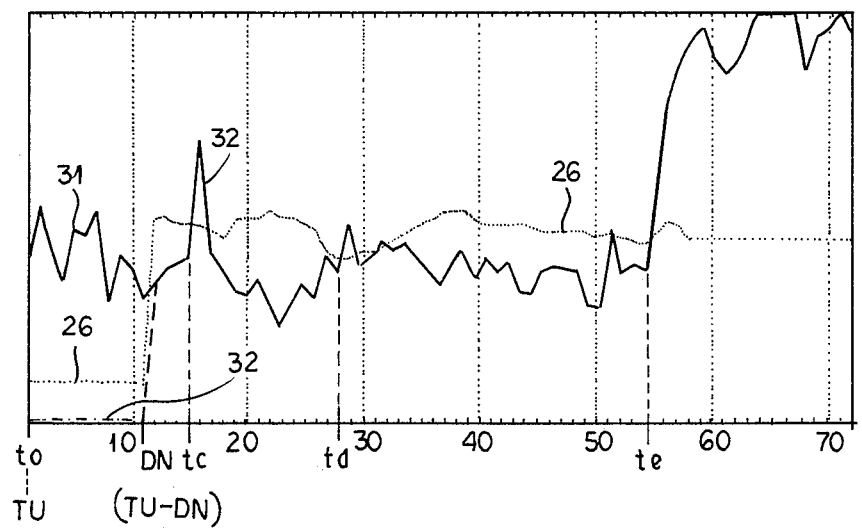
FIG.4

DEVICE FOR SPEAKER'S VERIFICATION

FIELD OF THE INVENTION

This invention relates to analysis systems of speech characteristics of speakers, in particular, to a device for a speaker's verification.

BACKGROUND OF THE INVENTION

A device for speaker's verification has to ascertain that the identity stated by a speaker corresponds to the true speaker's identity. The speaker has to say a standard sentence from which the device obtains typical speech parameters which are compared with average speech parameters of the same speaker, obtained in a previous training phase, in which that speaker had to repeat the same standard sentence many times. The comparison is carried out by calculating the probability that the sentence just spoken belongs to that speaker. If the probability value is greater than a certain threshold, then the device considers the speaker to be verified.

The devices known for speaker's verification, as for example that described in the paper "A low cost speaker verification device" presented by M. H. Kuhn, R. Geppert at Carnahan Conference on Crime Countermeasures, held at the Univ. of Kentucky, Lexington, 14–16 May 1980, generally consist of the following circuit units:

a parameter extraction unit, which divides each just spoken sentence into time intervals of suitable fixed duration, and calculates the energy associated with the signal for each interval and for each frequency band constituting the frequency spectrum of the speech band, obtaining an energy vector for each time interval. Then, it averages the power vectors of all intervals, thus obtaining a vector of average parameters, where each component is pertinent to a frequency band;

a unit determining the distribution of average speaker parameters for several repetitions of the same sentence. This block works during the training phase and prepares distribution histograms, one for each frequency band, of average energy levels obtained for each sentence. A histogram memory is created for each speaker;

a unit for probability calculation. This unit works during the verification phase and for each frequency band it verifies at which point of the related histogram, read in the speaker memory, the new value of average parameter just calculated by the parameter extraction block is found and it assigns a corresponding probability value that the new value belongs to the speaker. Then, this unit multiplies all probability values and compares the product with a fixed threshold value.

The known devices have disadvantages:

it is difficult to establish the real instants of beginning and end of the sentence, so that the parameter extraction unit will not consider also time intervals in which only noise is present;

the real sentence duration changes at each speaker's repetition, then the fixed number of acoustical events (characteristic of a given sentence) is divided into a variable number of time intervals. During the various repetitions of the same sentence, the same events have different weights, and thus the validity of the time average function is reduced; and a fixed probability threshold does not favor, in the verification process, those speakers whose histograms of average parameter distribution have a higher variance, i.e. a higher dispersion of average parameter values during the repetitions of the same sentence, so that the probability of no verification increases.

Some methods known for determining the beginning and end points of the sentence are essentially based on the measure of speech signal energy.

A first method effects a comparison between the energy of the speech signal and a threshold value possibly adapted to the background noise present at the beginning in the environment.

Another method described in the article "An algorithm for determining the endpoints of isolated utterances" by L. R. Rabiner and M. R. Sambur, The Bell System Tehcnical Journal, V. 54, No. 2, February 1975, proposes a comparison between the speech signal energy and two thresholds of different value. The sentence beginning or end is established by the lower value threshold overcoming if the higher value threshold is overcome before a new overcoming of the lower threshold.

If the sentence begins and/or ends with a consonant, the corresponding time intervals adjacent to that of the real sentence are added. They are calculated according to the determination of the number of zero crossings of the acoustical signal in those time intervals.

All these methods have the drawback that an unexpected peak of high-energy noise is interpreted as a beginning or end point of a sentence.

SUMMARY OF THE INVENTION

These problems are overcome by the present invention of a device for speaker verification which has a detection circuit for the points of sentence beginning and end based on the measurement of speech signal power and of time duration where a power threshold is exceeded. The threshold value is constantly adapted to background noise level. Furthermore, the device has a circuit for time alignment which, giving a new implementation to a dynamic programming algorithm, changes selectively the time axis of each sentence where power vectors are projected. The power vectors are calculated by the parameter extraction unit so that the total duration of all sentences is equal and each acoustical event related to the different repetitions of the same sentence has a standard weight. Finally, the device has a circuit calculating the probability threshold which makes the threshold value inversely proportional to the variance value of the histograms of average parameter distribution, so as to assign all speakers with the same probability to be detected.

BRIEF DESCRIPTION OF THE DRAWING

These and other features will become more readily apparent from the following description, taken in conjunction with the accompanying drawing in which:

FIG. 4 is a time diagram of some internal signals of block RIF;

SPECIFIC DESCRIPTION

Figure 1:
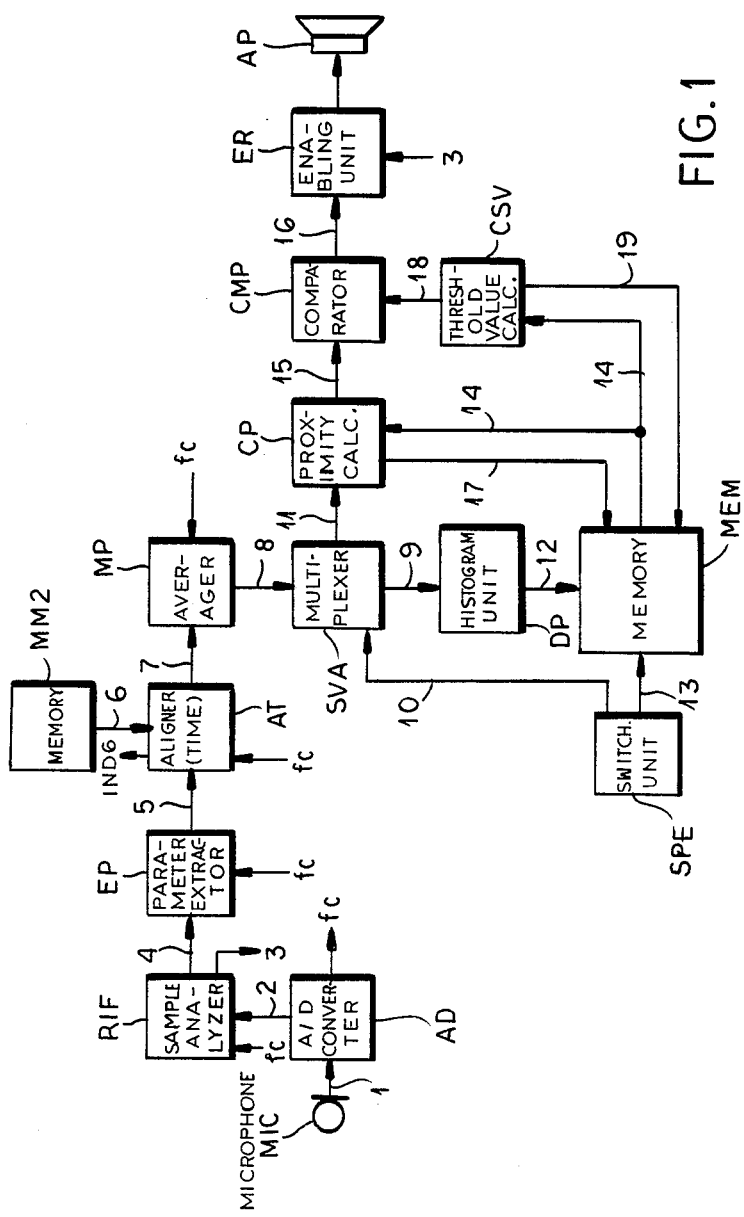
FIG. 1 is a general block diagram of the device of the invention.

FIG. 1 is the block diagram of speaker's verification device. The device has an asynchronous operation, i.e. each circuit block, at the operation end, controls the operation beginning of the following circuit block.

MIC is a microphone which transduces the speaker voice into an electric signal with frequencies within the speech band. In the example described, this band is between 300 and 3400 Hz.

The electric signal reaches block AD via wire. The block AD comprises a band-pass filter, with 300 to 3400 Hz band, and an analog-digital converter, with sampling frequency $f_c$ equal to 8 kHz. The digital samples obtained are sent via bus 2 to block RIF and stored in its internal memory. The signal with sampling frequency $f_c$ is sent by AD to RIF as a reference.

Block RIF establishes the real instants of beginning ti and end tf of the sentence spoken by the speaker by analyzing the digital samples of the whole time interval TU useful for saying the sentence.

RIF, using signal $f_c$ as a reference, divides the useful time interval TU into subintervals of 32 ms, called in the following intervals j, each comprising a finite number of digital samples. Then, instants ti and tf will be the instant of beginning of the first useful interval j (called in the following interval ti) and end of the last useful interval (called in the following interval tf).

Having determined ti and tf, RIF sends to block EP via bus 4 the control signal of operation beginning and the digital samples related to intervals j, then called real intervals, between ti and tf.

Block RIF will be detailed in connection with FIG. 3.

Block EP extracts characteristic sentence and speaker parameters. It essentially consists of a set of digital bandpass filters which cover the whole speech band. Each filter is followed by an integrator which calculates the energy associated with the signal in that band in a real interval j and by an accumulator register which stores the values calculated by the integrator.

An energy vector $\bar{e}_j = e_{1j} + \ldots + e_{kj} + \ldots e_{Kj}$ is obtained for each real interval j, where K is the number of filters used (in the example K=17) and j the current variable which identifies the number of the real interval ($1 \leq j \leq J$). At the sentence end, a vector set is obtained forming the following matrix:

$$X_{KJ} = \bar{e}_1 + \ldots \bar{e}_j + \ldots \bar{e}_J$$

Matrix $X_{KJ}$ represents the set of characteristic parameters of speaker voice for a given sentence spoken. These parameters are sent via bus 5 to block AT which stores them in its internal memory. Blocks EP and AT are synchronized by signal $f_c$ supplied by AD.

Block EP supplies via a supplementary wire of bus 5, at the operation end, a signal of operation beginning for block AT. Block AT aligns in the time the sentence parameters to parameters of a reference sentence present in block MM2, consisting of a read only memory.

The time-normalization selectively modulates the length of time axis of the different sentences so that, after alignment, the total duration of all sentence repetitions is equal and each acoustical event has a similar duration during all repetitions, in order to avoid duration variability of corresponding acoustical events for different repetitions of the same word by the same speaker. This effect is still higher in the case of a whole sentence.

The reference sentence is always and only the sentence used in verification and training phases. This sentence is repeated several times by each of a given number of speakers (let us underline that these speakers could also be speakers not to be verified by the device). In this sentence set, we choose the sentence with the minimum out of maximum distances from other sentences, where distance means the difference between the values of the parameters extracted from sentences. This method of reference sentence choice is known as "clustering technique" and is described for example in the article "Considerations in applying clustering technique to speaker—independent word recognition" by L. R. Rabiner and J. G. Wilpon, Journal of Acoustical Society of America, V. 66, No. 3, September 1979.

Memory MM2 presents the matrix of characteristic parameters of reference sentence matrix, called in the following $X_M = \bar{e}_1 + \ldots \bar{e}_m + \ldots \bar{e}_M$; it is obtained with the technique described in connection with block EP, where M is the total number of real intervals.

Figure 2:
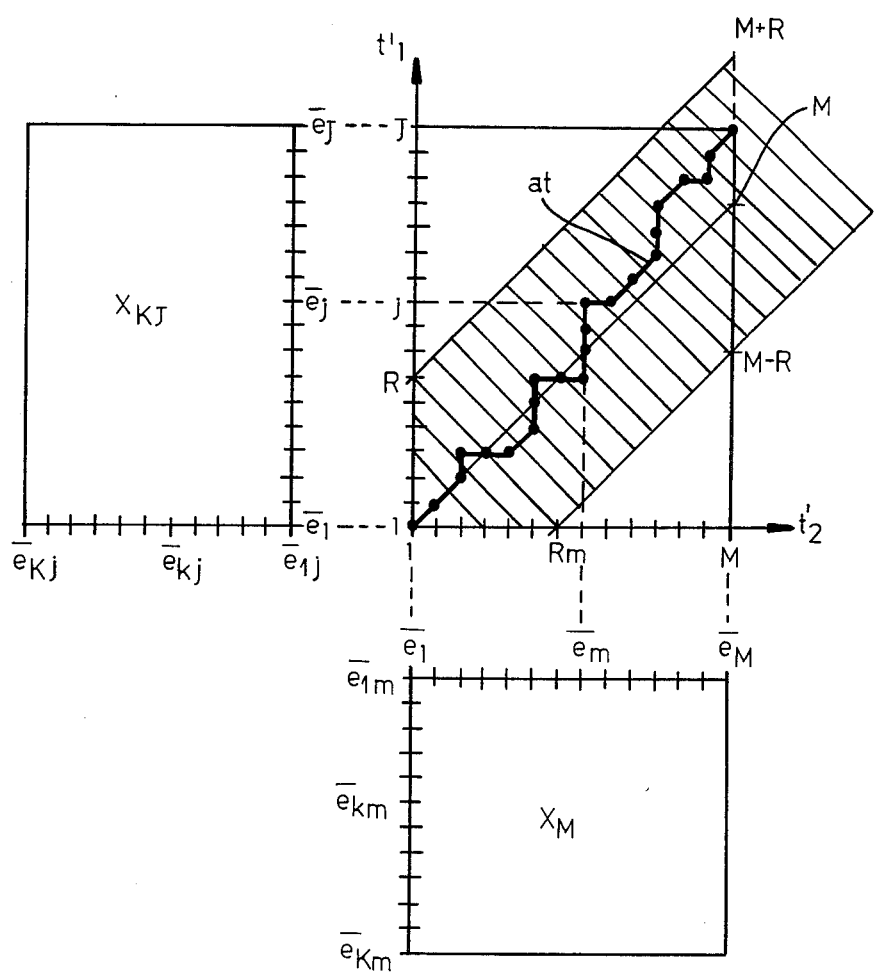
FIG. 2 is a time diagram related to the operation of block AT of FIG. 1.

Block AT carries out the following operations on each parameter matrix reaching block EP:

(a) preparation of a correspondence table between indices j of matrix $X_{KJ}$ and indices m of matrix $X_M$, shown in FIG. 2 by broken line at called "alignment path";

(b) preparation of a matrix $X_{KM}$ of the type of $X_M$ of reference sentence, obtained as the projection of starting matrix $X_{KJ}$ through broken line at.

Let us now describe the operations carried out by AT pertinent to item (a) and FIG. 2.

For building the broken line at, block AT implements a known algorithm of dynamic programming, starting from the parameter matrices of the sentence just spoken, taken from EP, and of the reference sentence, read in MM2 via bus 6.

An example of this algorithm is described in the article "Dynamic programming algorithm optimization for spoken word recognition" by H. Sakoe, S. Chiba, IEEE Transactions on Acoustics, Speech and Digital Processing, v. ASSP-26, No. 1, February 1978.

In FIG. 2, $X_{KJ}$ is the parameter matrix of the sentence just spoken: time dimension $(1, \ldots j, \ldots J)$ is vertical, while frequency dimension $(1, \ldots k, \ldots K)$ is horizontal. Symbol $X_M$ is reference sentence matrix: time dimension $(1, \ldots m, \ldots M)$ is horizontal, while frequency dimension $(1 \ldots K)$ is vertical. The time dimension of $X_{KJ}$ is projected on time axis $t'_1$ divided into J intervals $(1 \leq j \leq J)$; time dimension of $X_M$ is projected on time axis $t'_2$ divided into M intervals $(1 \leq m \leq M)$. Broken line at built by AT joins points (1, 1) and (J, M) of plane $t'_1$, $t'_2$.

The algorithm used for broken line at building comprises the following steps:

calculation of matrix $D_{JM}$ (J.M size) of distance values D(j, m) between vectors $\bar{e}_j$ and $\bar{e}_m$, where distance means the addition of absolute values of differences between components of equal index of the vectors, calculated for each pair of values j, m;

calculation of matrix $G_{JM}$ (J.M size) of values of accumulated distance G(j, m) between vectors $\bar{e}_j$ and $\bar{e}_m$, calculated for each pair of values j, m, where accumulated distance G(j, m) means the following expression:

$$G(j,m) = \min \begin{cases} G(j, m-1) & + & D(j,m) \\ G(j-1,m) & + & D(j,m) \\ G(j-1, m-1) & + & D(j,m) \end{cases}$$

calculated starting from j=1 and m=1;

preparation of matrix $P_{JM}$ (J.M size) containing in each point (j, m) the information on direction from where the minimum of the three values shown in the expression G(j, m) arrives. This direction is the slope P(j, m) of the segment joining point (j, m) and point (j, m−1) or (j−1, m) or (j−1, m−1) from where the minimum of the three values arrives; and construction of broken line at, starting from point (J, M) and going back according to slopes P(j, m) determined by previous step up to point (1, 1).

In practice, matrices D, G and P are only calculated at points where indices meet the following relation:

$$|j-m| \leq R$$

i.e. at the internal points of the dashed area in FIG. 2; this involves the exclusion of sentences with real duration very far from reference sentence duration, i.e. sentences so that $(M-R) \leq J \leq (M+R)$.

Let us now describe the operations carried out by AT pertinent to item (b) and FIG. 2, taking into account that matrix $X_{KM}$ instead of matrix $X_M$ is considered.

AT writes in the positions of matrix $X_{KM}$, whose index m is the coordinate on axis $t'_2$ of broken line at, vectors $\bar{e}_j$ whose index j is the corresponding coordinate on axis $t'_1$, except at segments with vertical slope for which AT writes in the position of $X_{KM}$, whose index m is the coordinate on axis $t'_2$ of these segments, vector $\bar{e}_m$ whose components are the arithmetic average of the corresponding components of vectors $\bar{e}_j$ whose index j is a corresponding coordinate on axis $t'_1$ of at segment. In general, in the passage from matrix $X_{KJ}$ to $X_{KM}$, through broken line at, the weight to be given to each vector $\bar{e}_j$ varies in the following way:

at segments with oblique slope keep unchanged the weight to be given to vectors $\bar{e}_j$ of $k_{XJ}$;
at segments with vertical slope divide by a factor equal to the number of vectors $\bar{e}_j$ interested the weight to be given to them;
at segments with horizontal slope multiply by a factor equal to the number of vectors $\bar{e}_m$ interested the weight to be given to vectors $\bar{e}_j$.

Then, block AT reduces the time variability of each speaker and gives each sound, contained in each interval j, a standard length. Thus, the parameters extracted at each interval j in block EP, and time-aligned in AT, can have a standard weight in time average calculation carried out in block MP, which receives these parameters via bus 7.

In FIG. 1, MP is a block consisting of accumulator registers, adders and dividers synchronized by signal $f_c$, which carry out the arithmetic average, interesting all real intervals M of the sentence, of the parameters related to each frequency band of vectors $\bar{e}_m$ supplied by block AT via bus 7, obtaining vector $$\tilde{e} = \tilde{e}_1 + \ldots \tilde{e}_k + \ldots \tilde{e}_K$$

called in the following vector of average parameters, where a component $\tilde{e}_k$ is given by the arithmetic average of components of corresponding index of vectors $\bar{e}_m$.

Vector $\tilde{e}$, present in internal accumulator registers, is then emitted on bus 8.

SVA is a typical one-input two-output multiplexer, whose signal input receives, via bus 8, the data present at MP output. SVA supplies the data on bus 9 or bus 11, according to logic level on wire 10 applied to its control input.

If the device is in training phase, SVA emits data via bus 9 to block DP, while if the device is in verification phase, SVA supplies data to block CP, via bus 11.

Two repetitions of the same sentence will never be equal, nor originate the same components of vector of average parameters $\tilde{e}$. Hence, speaker verification could not be made in a deterministic way, but requires a probabilistic approach using pattern recognition techniques. Then, during the training phase, the speaker has to repeat the same sentence a certain number of times; for each repetition, at the output of block MP, a given vector of average parameters $\tilde{e}$ of the sentence just spoken will be present.

A distribution histogram of average parameters of all vectors $\tilde{e}$ is prepared in DP and approximates the curves of probability density related to each spectral component.

Then, a tridimensional space is detected where:

a first dimension consists of the range of energy values, discretised on a range of N intervals (in the example described N=16), characteristic of each frequency band k;

a second dimension consists of the central frequency values of filter bands of block EP (K frequency bands are detected);

a third dimension consists of the number of events $P_{kn}$ recorded for each frequency band and each energy interval.

The probability theory shows that the higher the number of events the better approximated are the probability density curves.

On the other hand, the same sentence cannot be repeated hundreds of times by the same speaker.

Then, in the histogram, DP does not record the number of real events, but, for each real event, it records a pseudo-event distribution centered around the value of the real event itself. Then, for each vector of average parameters $\tilde{e}$ received at the input, DP verifies in which interval of energies n each component falls; in the histogram, it does not increment by 1 the number of events in the intervals found, but for each component it increases by a total number a psuedo-events equal to $N_P$ (in this example $N_P=25$) distributed around the interval n found, according to a certain distribution law (e.g. 7 pseudo-events in interval n, 5 pseudo-events in intervals $n \pm 1$, 3 pseudo-events in intervals $n \pm 2$, 1 pseudo-event in intervals $n \pm 3$). The result is a fictitious increase in the number of real events, which better meets the necessity of preparation of probability density curves so that they will be smoother, with no great differences between adjacent intervals.

Then, in the training phase, an histogram for each speaker is generated and each speaker has to repeat the same sentence only 20 times.

Memory MEM is divided into areas typical of each speaker, where block DP writes, via bus 12, the histograms generated. At the end of the training phase, the signal on wire 10 changes logic level and switch SVA is switched to the verification phase. Then, the new vectors of average parameters $\tilde{e}$ generated by MP are supplied to block CP, which calculates the probability that the sentence just spoken belongs to the speaker.

Let us underline that during the verification phase, each speaker, before saying the identification sentence, has to declare his identity (then verified by the device), e.g. to write his name or an identification code on a keyboard suitably set or to introduce into a reader connected with the device a magnetic card which records identification data. These preliminary operations are shown in FIG. 1 by switch SPE which sends to memory MEM via connection 13 a selection signal of the area dedicated to that speaker and a writing signal, if the device is in training phase or a reading signal, if the device is in verification phase. Furthermore, SPE supplies to SVA the control signal via wire 10, generated by an internal switch and operated, for example, by hand from outside. Block CP verifies the energy interval n where each component of the new vector $\overset{N}{e}$ falls; then, it addresses via bus 17, the MEM memory area chosen by SPE, for reading, via data bus 14, the number of pseudo-events $p_{kn}$ related to that interval and calculates the area $A_k$ as an addition of all pseudo-events pertinent to a component of e, always sent via bus 14.

Then, assuming that the values of the components of $\tilde{e}$ are statistically independent, it calculates the probability P that the sentence belongs to that speaker, using the formula:

$$P = \prod_{k=1}^{K} \frac{P_{kn}}{A_k} \quad (1)$$

where $\pi$ is the product interesting all components of $\tilde{e}$. Value P is sent via bus 15 to an input of comparator CMP.

Block CMP compares value P with a suitable threshold value Pss calculated by block CSV and sent to the second input of CMP via bus. If $P > Pss$, then the sentence just spoken is interpreted as really belonging to that speaker and the indentity declared by the speaker is interpreted as corresponding to true identity.

In the known systems, the threshold value is calculated according to the following relation, where the threshold value is Ps:

$$Ps = \prod_{k=1}^{K} \frac{1}{\sqrt{2}} \cdot \frac{P_{kMAX}}{A_k} \quad (2)$$

where $p_{kMAX}$ is the maximum number of events, for each frequency band, read in the histogram stored in MEM via connection 14, and $A_k$ is the above defined area.

This formula does not take into account the variances of the histogram curves. This does not supply all speakers with the same probability to be verified, as verification probability is inversely proportional to curve variance value.

Then, according to an apsect of the present invention, block CSV calculates a variable threshold value Pss given by the following relation:

$$Pss = Ps/Y \quad (3)$$

where Ps is the value given by formula (2) and Y is:

$$Y = \left[ \prod_{k=1}^{k} \frac{\sigma_k}{\sigma_{NORM}} \right]^{z/k} \quad (4)$$

where $\sigma_{NORM}$ is the variance value of a given speaker taken as a reference; z is a fixed corrective exponential factor; $\sigma_k$ is the standard deviation of k-th curve of histogram, calculated by the relation:

$$\sigma_k = \sqrt{\sum_{n=1}^{N} (P_{kn} - \overline{P}_k)^2} \quad (5)$$

where $\overline{P}_k$ is the event average of k-th curve.

Since Ps is inversely proportional to curve variance, the new value Pss tends to become independent of variance.

Then, if CMP verifies that $P > Pss$, it supplies a signal of speaker verified, via wire 16, to block ER which transforms it into an enabling signal which can for example consist of an acoustic emission via loudspeaker AP.

Otherwise, CMP emits a signal of speaker not verified.

Figure 3:
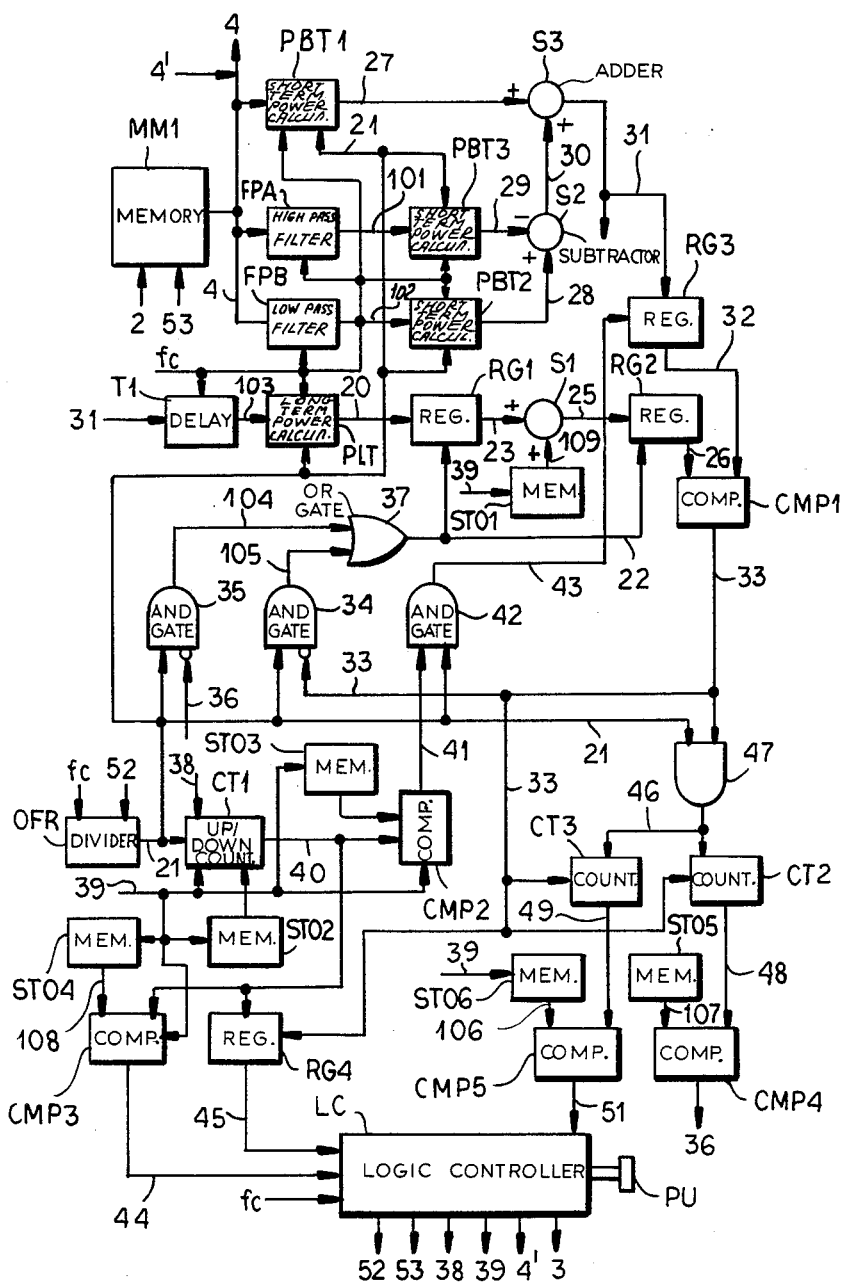
FIG. 3 shows the circuit diagram of block RIF of FIG. 1.

In FIG. 3, MM1 is a typical read only memory.

MM1 receives the addresses and the control signals via bus 53, while via bus 2 it receives from block AD of FIG. 1 the digital samples to be stored.

During the reading phase, MM1 supplies in succession these samples via bus 4.

PBT1 is a block which calculates the short-term power PBT associated with the digital samples received via bus 4, where short-term means a period of an interval j.

PBT1 calculates the square of the digital samples received and, at each interval j, the average of the values calculated interesting that interval and then the logarithm of said average emitted via bus 27.

PBT1 is synchronized by signals fc and 21. FPB and FPA are two digital filters, low-pass and high-pass respectively, which filter the digital signal present on bus 4 and then send it to blocks PBT2 and PBT3, equal to PBT1.

In this example, cut-off frequencies of FPB and FPA are 900 and 2000 Hz.

Then, at each interval j, the output of PBT2 on bus 28 presents the value PPB of short-term power associated with the digital low-pass filtered signal, while the output of PBT3 on bus 29 presents the value PPA of short-term power associated with the digital high-pass filtered signal.

S2 is a digital subtractor which subtracts the signal present on bus 29 from the signal on bus 28 and sends via bus 30 the result to an input of the digital adder S3 whose second input presents the output signal of PBT1 on bus 27.

At the output of S3, bus 31 presents the logarithmic value:

$$PBTP = PBT + PPB - PPA$$

i.e. the logarithm of the value of short-term power weighted according to quantity PPB−PPA.

Bus 31 is connected with the input of blocks RG3 and T1. RG3 is a typical register which receives the values PBTP present on bus 31, stores them temporarily and emits them via bus 32. RG3 receives as clock signal the signal on wire 43.

Bus 32 is connected with an input of comparator CMP1.

T1 is a delay circuit for the digital signal received from adder S3 via bus 31; the delay introduced covers a certain number of intervals DN equal to the minimum delay time estimated between the instant of beginning of useful time for sentence pronuncation and the instant where the speaker begins to speak. In this example, DN=12.

T1 is a typical shift register controlled by the sampling frequency signal $f_c$.

The delayed samples are then sent by T1 to block PLT which calculates the long-term power associated with the digital signal, where "long-term" means a period of a certain number NFN of consecutive intervals j.

Block PLT stores in its internal shift register the values received from T1 relating to the last NFN intervals j elapsed (in this example NFN=12). At each interval j, it evaluates the average interesting the last NFN intervals j of the squares calculated, and then the logarithm of said average emitted via bus 20.

PLT is synchronized by signals $f_c$ and 21; signal 21 has a period equal to an interval j.

RG1 is a typical register which receives the values of long-term power from PLT and, using the signal on wire 22 as a clock signal, temporarily stores them and emits them via bus 23.

When the clock signal stops, the output of RG1 remains fixed at the value stored in the last period of the clock signal.

Data on connection 23 are added in adder S1 with a constant value, called in the following lock threshold SAG, stored in memory STO1. The lock threshold presents different values for the research phases of the real points of sentence beginning and end (in this example 6 and 5 dB). These values are read according to two logic levels of signal 39 supplied to STO1 as address.

Data outcoming from S1 via connection 25 are supplied to register RG2, similar to RG1, which, when the clock signal is present on wire 22 supplies them via connexion 26 to the second input of comparator CMP1. When the clock signal stops, also RG2 output remains fixed.

CMP1 emits via wire 33 a signal indicating which input value is higher: if bus 26 presents a value higher than bus 32, wire 33 presents a logic zero; in the opposite, it presents a logic one.

OFR is a frequency divider of signal $f_c$ received; OFR emits via wire 21 a signal having a period equal to that of interval j. The output of OFR is enabled when the signal on wire 52, applied to the enabling input of OFR, is active.

Wire 21 is connected with an input of AND gates 34 and 35, whose second inputs connect the complementary values of signals on wires 33 and 36. The outputs of gates 34 and 35 represent the inputs of OR gate 37 whose output is the enabling signal on wire 22.

CT1 is a programmable up-down counter which counts the interval number, then the number of periods of the signal on wire 21.

CT1 receives the command of counting beginning via wire 38 and up-down counting via wire 39; furthermore, for the up-counting, carried out during the research of sentence beginning point, it is programmed to value 0, while for the down-counting, carried out during the research of sentence end point, it is programmed to the maximum frame number NFMAX, i.e. the number of frames being present in the interval of useful time to pronounce the sentence.

Values 0 and NFMAX are stored in memory STO2 read through up-down signal of wire 39.

CT1 output via bus 40 is connected with a typical programmable comparator CMP2 which compares it with a threshold value stored in memory STO3.

During the search phase for sentence beginning point ti, the threshold consists of value DN. When the counting value supplied by CT1 via bus 40 becomes higher than the threshold supplied by STO3, CMP2 emits an enabling signal via wire 41 supplied to AND gate 42 allowing said gate to supply the signal on wire 21, applied to its second input, to block DR via wire 43 as enabling signal.

During research phase of sentence end point tf, the threshold consists of value (NFMAX−DN); when the counting supplied by CT1 is lower than the threshold, CMP2 emits an enabling signal via wire 41.

The signal on wire 39 then reaches STO3, as address to choose the threshold value, and CMP2 in order to program the comparison to be carried out. CMP3 is a programmable comparator similar to CMP2 which detects a possible error condition verified if the circuit of FIG. 3 does not detect the real sentence beginning or end points.

CMP3 compares the counting value of CT1, supplied via bus 40, with a threshold value supplied by memory STO4.

During the search phase for point ti, the threshold supplied by STO4 consists of the value (NFMAX−40). If the counting value of CT1 becomes higher than the threshold, CMP3 emits an error signal via wire 44.

During the search phase for point tf, the threshold supplied by STO4 consists of value 40; if the value counted by CT1 becomes lower than the threshold, CMP3 emits an error signal via wire 44.

The signal on wire 39 is carried to STO4 as an address to choose the threshold to be emitted, and to CMP3 in order to program the comparison to be carried out.

RG4 is a register which stores the number of intervals present on bus 40 at the instant where the enabling singal on wire 33 switches to 1. In fact, the signal on wire 33 reaches the clock input of RG4. The value stored is then supplied on bus 45.

CT2 is a counter which counts up to a maximum value (in this example it counts up to 3) from the instant where the signal on wire 33, applied to its reset input, changes logic level. CT2 counts the signal periods on wire 46 being the output of AND gate 47 whose inputs are connected with wires 21 and 33. The signal on wire 33 enables AND gate 47 in order to supply the signal on wire 21 to CT2 via wire 46. CT2 supplies the counting via bus 48 to comparator CMP4 which compares it with a given threshold stored in memory STO5.

As long as the threshold is not exceeded, CMP4 supplies the enabling signal via wire 36 to gate 35 which then is enabled for 3 intervals j successive to that where the signal on wire 33 changes logic level. In other words, for 3 intervals j successive to that where AND gate 34 is disabled, the signal on wire 21 is still supplied to registers RG1 and RG2 via AND gate 35.

CT3 is a counter similar to CT2; it receives the signal via wire 33 as reset signal and counts the signal periods of wire 46 received at the counting input.

CT3 supplies the counting via bus 49 to the first input of comparator CMP5 which compares it with a threshold value supplied by memory STO6 and called "number of optimum lock intervals"; during the search phase for point ti, the threshold value (FRAGB) is set to 15, while during research phase of point tf, the threshold (FRAGE) is set to 18. Signal 39 is supplied to STO6 as address for threshold value choice.

When the value on bus 49 exceeds the threshold supplied by STO6, CMP5 emits an enabling signal on wire 51 indicating that the number of interval j present in RG4 is considered as real sentence beginning or end point, i.e. as interval ti or tf.

LC is a logic control circuit whose implementation is not a problem for a technician having knowledge of the logic functions carried out and described in the following.

Circuit LC, as the whole block RIF, operates in the same way during either training or verification phase.

LC generates and supplies via bus 53 the addresses for memory MM1 using the sampling frequency signal $f_c$ sent by AD (FIG. 1). Then, LC contains a programmable up-down counter which counts the periods of signal $f_c$. The count is sent via bus 53 as an address. Bus 53 presents also the read/write control signal for MM1.

At the beginning instant of useful time for pronouncing a sentence (in this example this is the instant where the speaker acts on push-button PU), the internal counter of LC begins an up-counting starting from value "0"; furthermore, LC generates the writing signal for MM1.

At the end of the useful time for pronouncing the sentence, established by an internal clock of LC, address counter is reset to zero, and enabling signals 52 and 38, up-counting signal for CT1 on wire 39, and reading signal for MM1 are generated.

Now, the reading of digital samples in memory MM1 begins together with the search phase for the real sentence beginning point. Two cases are possible: an error signal is received via wire 44, or an enabling signal is received via wire 51.

In the first case, RIF operations are stopped. The speaker has to repeat the just spoken sentence: LC sends via wire 3 a corresponding signalling to block ER (FIG. 1).

In the second case, LC stores in an internal register the value present on bus 45, i.e. the number of interval ti, and then establishes the beginning of research phase of real sentence end point.

LC changes the logic signal level on wire 39 determining the down-counting of CT1, resets to value NFMAX the internal address counter and controls the down-counting.

Then, two cases are possible: an error signal is received via wire 44 or an enabling signal is received via wire 51. In the first case, RIF operations are stopped and the speaker has to repeat the sentence.

In the second case, LC stores in its internal register the value present on bus 45, i.e. the number of interval tf. Now, the research of real sentence beginnning and end points stops. Then, LC disables the signals on wires 52 and 38, calculates the value $tf-ti=J$ and compares it with the value M stored in an internal register: if $|J-M| \leq R$, it supplies the enabling signal via wire 4', connected with bus 4, to block EP (FIG. 1) in order to begin the phase of characteristic sentence parameter extraction: then, it resets the internal address counter to the value of interval ti present in its internal register and controls the up-counting up to the value of interval tf.

Conversely, if the comparison shows an opposite condition, LC emits a signal on wire 3 connected with block ER (FIG. 1) and determines the repetition of the just spoken sentence which resulted to be too quick or too slow.

Let us now describe the operation of block RIF, of FIG. 3, referring also to FIG. 4.

FIG. 4 shows a possible behaviour of the signals present on wires 4, 26, 31, 32 of block RIF of FIG. 3 during the research phase of real sentence beginning point ti. The time axis shows a division into intervals j starting from the instant to of phase beginning and corresponding to the first interval of the suitable period for sentence pronounciation. The research phase of real sentence end point tf uses the some curves of FIG. 4, but left to right direction is the time decreasing direction: then, instant to corresponds to interval TU of end of useful time for sentence pronounciation, interval ti becomes tf, interval DN becomes (TU−DN). When the speaker acts on push-button PU (FIG. 3), block LC begins to address via bus 53 memory MM1 where the digital samples related to the useful time interval TU for sentence pronounciation are written.

At the interval end, the research phase of point ti begins: from instant to on, LC again addresses MM1 which supplies the samples via bus 4.

Furthermore, LC makes active the signals on wires 52 and 38 and sends the signal 39 for up-counting to CT1 which begins to count the periods of signal 21 supplied by OFR.

At PLT output, bus 20 presents the long-term power values, while at S3 output, bus 31 presents the short-term power weighted values; on bus 20, data are delayed by a time equal to DN, introduced by block T1 (FIG. 3), with respect to data present on wire 31.

Signal 26 is increased by the lock threshold value SAG with respect to the signal on wire 20.

The signal on wire 32 is zero up to the instant DN where the output of CMP2 via wire 41 changes logic level and the signal on wire 43 is activated, from that instant on, signal 32 recalls the behavior of signal 31 shown in FIG. 4.

At instant tc, CMP1 output switches, as the signal on wire 32 takes a value higher than that on wire 26 and the signal on wire 33 goes to 1. Then, gate 34 is disabled, gates 42 and 47 are enabled and counters CT2 and CT3 begin to count, and the number of interval j present on bus 40 (i.e. the counting value reached by CT1) is stored in RG4.

If the signal on wire 33 remains at 1 for a time, after tc, sufficient for allowing the output 51 of CMP5 to switch (i.e. for 15 consecutive intervals j), then LC reads in RG4 the value stored and considers it as instant ti of real sentence beginning. FIG. 4 clearly shows that after interval tc the signal on wire 33 is higher than that on wire 26 only for 2 consecutive intervals. Then, counter CT3 is reset to zero by the same logic level on wire 33, before its counting overcomes the threshold value of STO6; LC does not read the value present in RG4 which is not considered as instant ti. The research of point ti continues as anything happened: in fact, counter CT1 continued its up-counting as it has not received reset signals; gate 34 is again enabled as well as registers RG1 and RG2; counters CT2 and CT3 are reset to zero.

This happens also after interval td where CMP1 again switches. In interval te, another switching of CMP1 takes place: in this case, CMP1 output remains at 1 for more than 15 consecutive intervals: then, output 51 of CMP5 switches, and LC reads in RG4 the value te and considers it as interval ti of real sentence beginning.

Then, LC changes the logic level of the signal on wire 39 and the research phase of point tf begins.

After instant tc, td, te, gate 35 is still enabled for the number of intervals counted by CT2 up to the switching of CMP4 output on wire 36; CT2, CMP4 and 35 have the effect to lengthen the enabling period of registers RG1 and RG2 for some intervals j successive to CMP1 switching; at this period end, the output of RG2 on bus 26 is fixed. Thus, the immunity to disturbances of research process of points ti and tf increases.

A last condition, not shown in the example of FIG. 4, concerns the case where after instant to or after a CMP1 switching for a too short period, the latter output switches no more; then, at interval (TU-40), CMP3 output on wire 44 switches signalling an error condition, i.e. a condition where the sentence has not been spoken, or its sounding level is insufficient. Then, LC goes back to the procedure beginning and sets memory MM1 for a new writing operation.

The operation of circuit RIF during the research phase of point tf is very similar to that described for point ti. Now counter CT1 counts down starting from maximum value TU.

At the end of this phase, LC disables signal 52 which blocks OFR output, and signal 38 which stops counter CT1. Then, LC activates signal 4' of enabling for block EP of FIG. 1 which successively receives on bus 4 the digital samples of the interval included within instants ti and tf.

Figure 5:
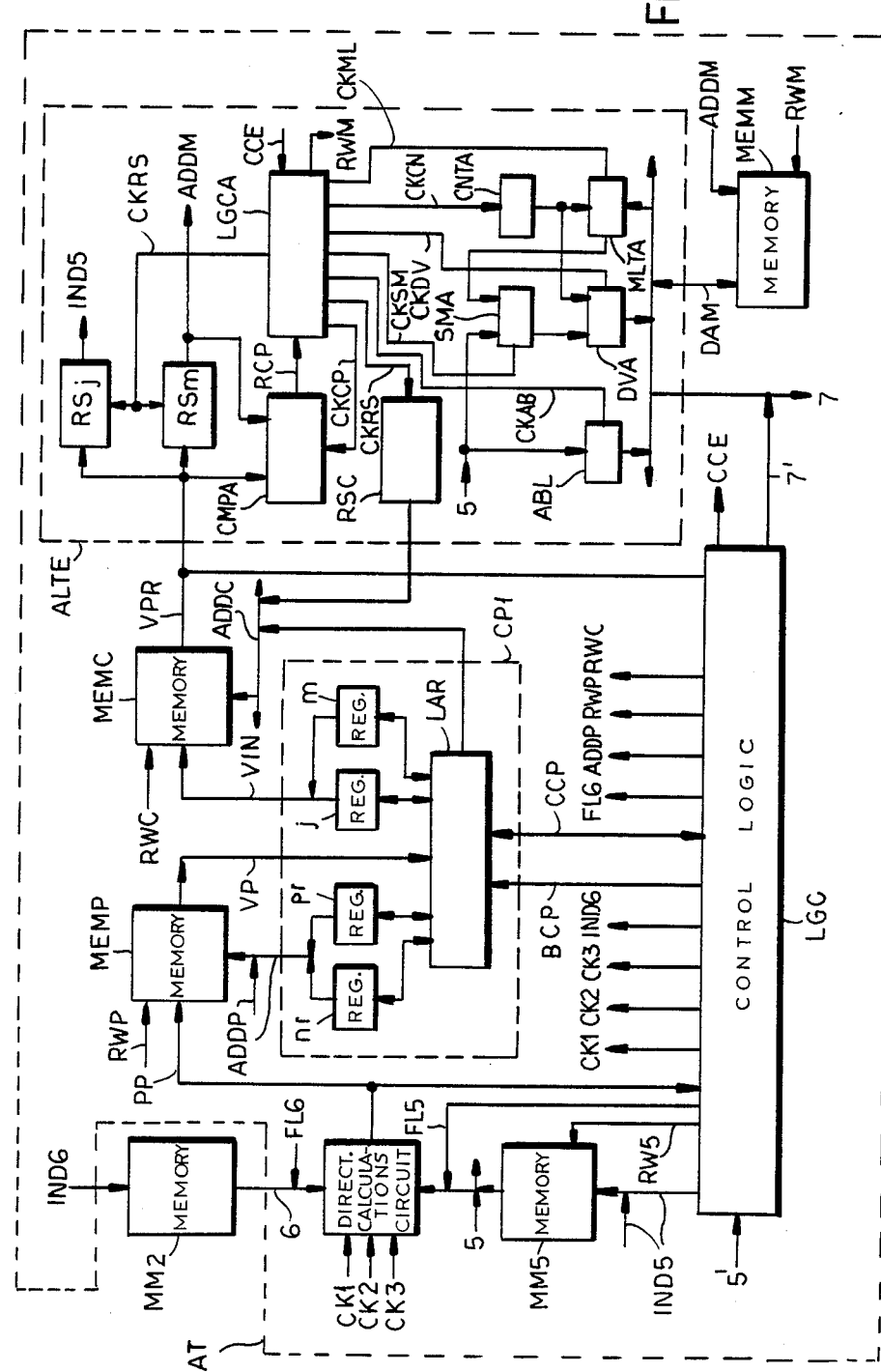
FIG. 5 is a circuit diagram of block AT of FIG. 1.

FIG. 5 shows the circuit diagram of block AT of FIG. 1.

For sake of completeness, memory MM2 of FIG. 1 is also shown in FIG. 5. In this FIGURE CBC is a circuit block which calculates matrices $D_{JM}$, $G_{JM}$ and $P_{JM}$.

MM2 supplies via bus 6 vectors $\bar{e}_m$ to CBC and is addressed via bus IND6 by control logic LGC.

MM5 is a random-access memory which receives from block EP of FIG. 1 via bus 5 vectors $\bar{e}_j$ of matrix $X_{KJ}$ then supplied to CBC via bus 5 and addressing supplied by LGC via bus IND 5. LGC supplies also to MM5 read/write signal via wire RW5.

At each data reading in memories MM2 and MM5, LGC supplies a logic "1" via wires FL6 and FL5 which become an additional wire of buses 6 and 5 and indicate the presence of data on the buses.

The internal structure of block CBC is now described with reference to FIGS. 6 and 7.

Figure 6:
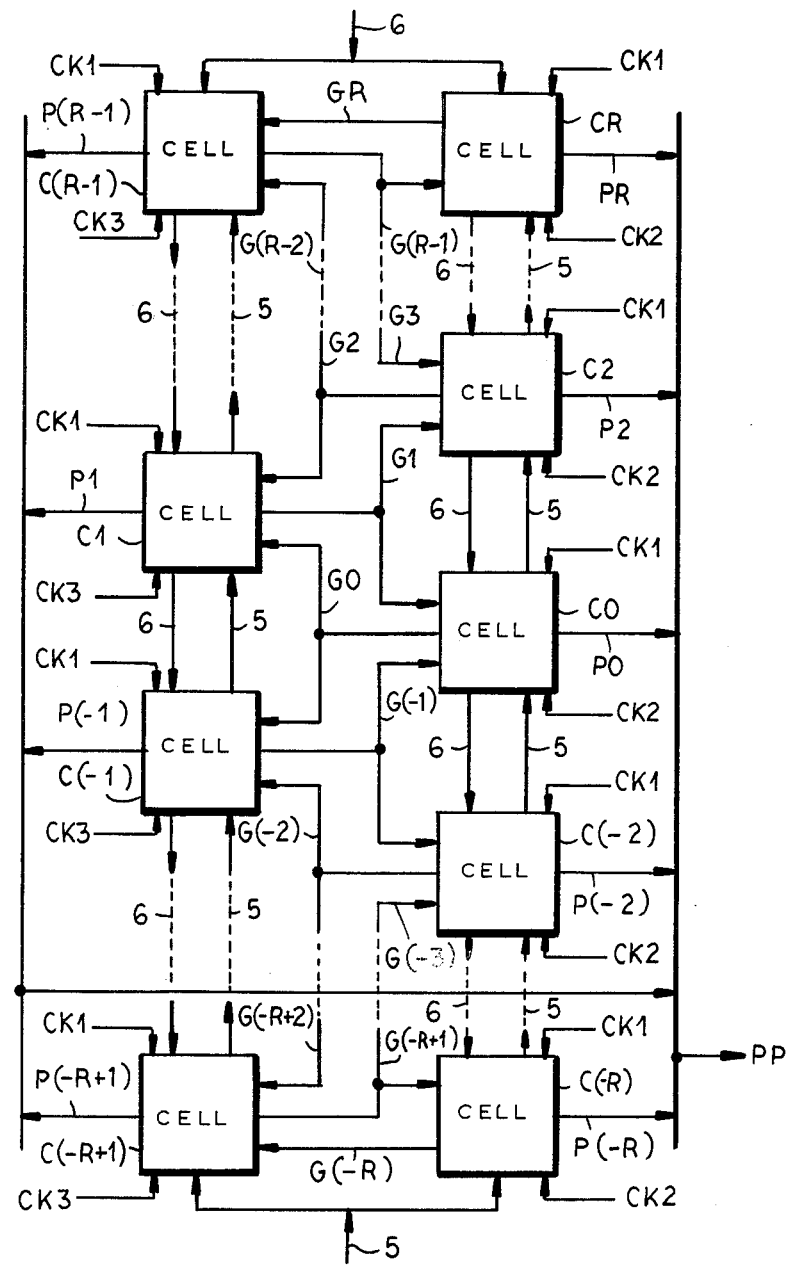
FIG. 6 is a circuit diagram of block CBC of FIG. 5.

In FIG. 6, C(−R) . . . CO . . . CR (where R is the value defined in connection with FIG. 2) are 2R+1 equal circuits, called in the following cells, interconnected according to two cascaded configurations of even and add indices.

Buses 5 and 6 are connected with cell inputs of opposite ends of cascaded configurations: the data carried by them (vectors $\bar{e}_j$ and $\bar{e}_m$ and the additional bit indicating data presence) flow in the opposite directions via the two cell cascades, so as at each step and under steady-state, a given cell presents at the same time the vectors $\bar{e}_j$ and $\bar{e}_m$ whose index difference is equal to cell index (e.g. cell CO presents the vectors having indices j=m and so on). Cells Cr (−R≦r≦R) calculate the elements of matrices $D_{JM}$, $G_{JM}$ and $P_{JM}$, as will be cleared by the description of the circuit structure of a cell, for example CO, shown in FIG. 7.

Figure 7:
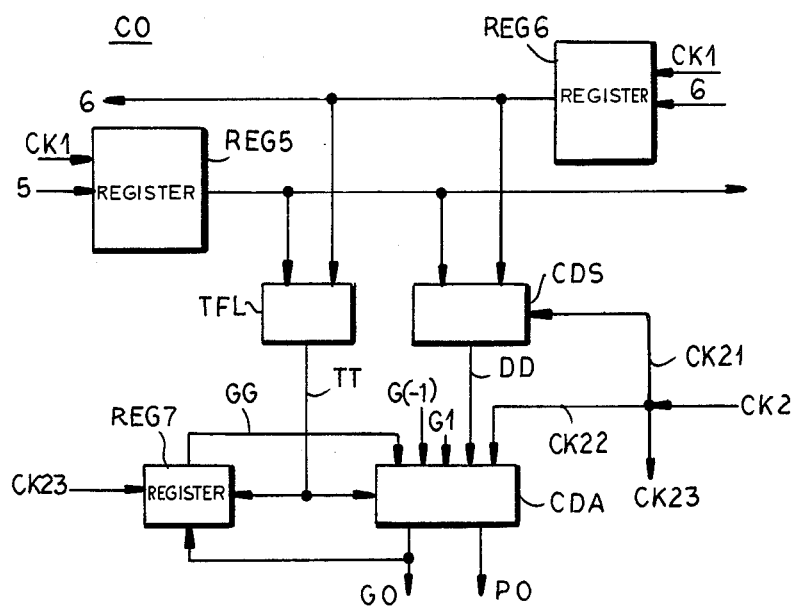
FIG. 7 is a circuit diagram of block CO of FIG. 6.

In FIG. 7, REG5 and REG6 are two equal parallel/parallel shift registers which represent a delay element, of a time equal to the period of clock signal CK1, applied to clock input and generated by block LGC (FIG. 5), for the data present on buses 5 and 6. The data on bus 6 at REG6 input come from the equivalent register of cell C2 (FIG. 6), while data outgoing from REG6 are sent to the equivalent register of cell c(−2); the opposite happens for data on bus 5 coming to REG5 from the corresponding register of cell C(−2) and destined to cell C2.

CDS is a block which calculates distance values D(j, m): it consists of K subtractors, one for each pair of components of vectors $\bar{e}_j$, $\bar{e}_m$ via buses 5 and 6, outgoing from registers REG5 and REG6, to the corresponding inputs of subtractors. CDS consists also of an adder of all values calculated by subtractors, considered with no sign information. Adder output is the distance value D(j, m) sent via bus DD to block CDA.

TFL is a block which sends via wire TT a signal enabling the operation of blocks CDA and REG7 in the case of contemporary presence of data on buses 5 and 6 of outputs of registers REG5 and REG6: TFL consists of an AND gate which checks the contemporary presence of a logic "1" on wires of buses 5 and 6 sending the information of data presence.

CDA is a block which calculates the accumulated distances G(j, m). The related inputs receive: the values of accumulated distance just calculated by cells C1 and C(−1) of contiguous index and sent via buses G1 and G(−1); via bus GG the value of accumulated distance calculated at previous step and temporarily stored in register REG7 whose input is connected with CDA output; the value of distance from block CDS.

CDA comprises a comparator which checks and sends to output via connexion PO an indication related to the minimum value of accumulated distance; the indication consists of two bits presenting the following values:

"11" if the minimum is G (j−1, m−1);
"10" if the minimum is G (j, m−1);
"01" if the minimum is G (j−1, m);
"00" if block CDA is not activated CDA comprises also an adder of distance value present on bus DD and of the minimum just checked of the three values of accumulated distance. The addition calculated is value G(j, m) emitted via bus G0.

CK21, CK22, CK23 are the clock signals for blocks CDS, CDA, REG7; these signals are obtained from signal CK1 duly delayed and constitute connexion CK2, coming from block LGC (FIG. 5).

Returning to FIG. 6, bus Gr (−R≦r≦R) outgoing from cell Cr is connected with the two cells of contiguous index pertaining to the other cascaded configuration. End cells CR and C(−R) connect only bus G(R−1) and G(−R+1) and then the free input, of corresponding circuits CDA (FIG. 7) of the cells, presents a bit configuration which will never be interpreted as minimum value by circuits CDA.

Connections Pr, outgoing from the different cells, form bus PP which will then consist of 2(2R+1) wires.

Clock signal CK1 reaches all cells of FIG. 6, while signals of connection CK2 reach only even-index cells (on the right in the figure); odd-index cells receive clock signals present on connexion CK3, i.e. clock signals present on connexion CK2 duly delayed.

The circuit of FIG. 6 operates as follows: at each pulse of CK1, data on buses 5 and 6 shift of a position via cells Cr in the two opposite directions, shown in the figure. Each cell begins to operate only when data are present on both buses 5 and 6 at its inputs. At $(R/2+1)$-th period of CK1, cells C0, C1, C($-1$) present data on both buses 5 and 6: cell C0 presents vectors $e_j$, $e_m$ having $j=m=1$; cell C1 presents vectors with $j=1$, $m=2$ and cell C($-1$) presents vectors with $J=2$, $m=1$.

During this period of clock signal CK1, the following operations will be carried out according to the following order:

cell C0 calculates value D(1,1); then G(1,1) supplied via bus G0; G(1,1)=D(1,1) as buses G(1), G($-1$), and GG have null values; then C0 calculates P(1,1) and sends it via connexion P0;

cells C1 and C($-1$) calculate values D(1,2) and D(2,1); then, values G(1,2) and G(2,1) supplied via buses G1 and G($-1$); then, values P(1,2) and P(2,1) supplied via connexions P1 and P($-1$).

This operation procedure gives automatically the time shifting typical of each clock signal of connexions CK2 and CK3 with respect to main signal on wire CK1.

At successive $(R/2+2)$-th period of CK1, the following cells will present vectors $\bar{e}_j$, $\bar{e}_m$ with the following index:

| in C0 | → | $j = m = 2$ |
| in C1 | → | $j = 2; m = 3$ |
| in C2 | → | $j = 1; m = 3$ |
| in C3 | → | $j = 1; m = 4$ |
| in C($-1$) | → | $j = 3; m = 2$ |
| in C($-2$) | → | $j = 3; m = 1$ |
| in C($-3$) | → | $j = 4; m = 1$ |

Then, within this period, the cells will carry out the calculations as previously described. During successive periods the number of cells activated will increase up to reach all cells activated, after $R+1$ periods of CK1.

Block CBC ends its operations when all cells are disabled, i.e. when respective circuits TFL (FIG. 7) check data absence on one or both buses 5 and 6.

Returning to FIG. 5, the structure of control logic LGC is automatically defined once the functions carried out and described below are carried out.

Block CBC supplies via bus PP slope values P(j,m) stored in the random-access memory MEMP which directly receives from LGC the read/write command RWP and via bus ADDP the addresses for writing phase.

Conversely, for reading phase, MEMP receives the addresses via bus ADDP from circuit CP1.

Figure 8:
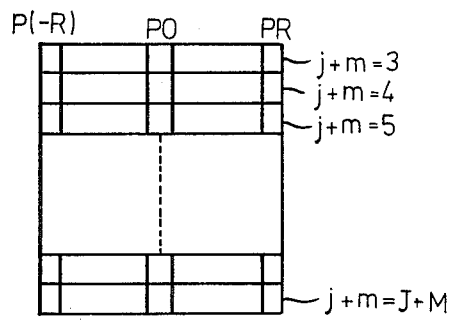
FIG. 8 shows a possible data organisation in memory MEMP of FIG. 5.

In MEMP, data are sequentially written, so as to obtain a table where each row has a size equal to bus PP size, as shown in FIG. 8.

Furthermore, circuit CBC calculates values P(j,m) so as bus PP alternatively presents the values calculated by odd or even index cells: this happens also in data positions in MEMP, as each row presents the values P(j,m) having a sum of indexes j, m equal to a constant alternatively odd or even value (FIG. 8).

Control logic LGC (FIG. 5) receives data of bus PP in order to check the presence of logic "1"'s, and supplies addresses to MEMP for writing phase in correspondence of the second data sending to P by CBC; value P(1,1) is not stored as it does not interest, being values P(j,m) the slopes of segments of broken-line at which precede equal index points. Furthermore, LGC ends the writing phase in MEMP when all CBC cells are disabled and PP presents all logic "0"'s: the last writing in MEMP takes place when $J+m=J+M$ (FIG. 8).

At the last writing operation in MEMP (FIG. 5), bus PP presents only a valid datum, i.e. value P(J,M), as all other CBC cells are already disabled. Then LGC controls the position Pr of P(J,M) and supplies to CPI via bus BCP the value of position Pr, and the value J+M corresponding to the last writing address. Furthermore, LGC obtains value J subtracting M from value J+M, M being a fixed value, supplies to CPI values J and M via bus BCP.

CPI is a circuit, whose structure is shown by the dashed-line, which generates the addresses for reading phase of MEMP taking place in opposite direction with respect to writing phase, starting from MEMP position where P(J,M) is present; furthermore, CPI generates data and addresses for memory MEMC which receives from logic LGC the reading/writing signal via wire RWP.

CPI consists of four registers j, m, nr, pr, which contain the current values of indexes j, m, number of row nr of MEMP, position Pr on the row of MEMP where value P(j,m) has to be read. These registers are loaded, at the beginning of CPI operations, via a command sent by LGC via connexion CCP, with initial values J, M, J+M, Pr; the contents of registers nr, pr, are used to address MEMP, while the contents of registers j, m are stored in memory MEMC of coordinates j, m of the points of broken-line at (FIG. 2).

CPI presents also an arithmetic logic LAR whose implementation is not a problem for a technician once defined the functions carried out and described in the following.

LAR has an iterative operation and during each iteration it carries out the following operations:

(a) writing in MEMC, via bus VIN, of the contents of registers j, m; it takes place sequentially by a counter which sends the counting on bus ADDC of the addresses for MEMC; logic LGC supplies to MEMC the writing signal via wire RWC;

(b) addressing of MEMP through the sending via bus ADDP of contents of registers nr, pr, and reading of value P(j,m) via bus VP; logic LGC supplies to MEMP the reading signal via wire RWP;

(c) changement of contents of registers nr, pr, j, m according to the check of value P(j,m) just received, in the following way:

if P(j,m)=11, it decrements by 2 units the row number in register nr, decrements by 1 unit the index values in registers j, m and in the successive step it reads in MEMP value P(j,m) of the same position of two previous rows: this corresponds to a back-step in an oblique segment on broken-line at (FIG. 2);

if P(j,m)=10, it decrements by 1 unit the row number in register pr, increments by 1 unit the row position in register pr, decrements by 1 unit the index value in register j, and in the successive step it reads in MEMP value P(j,m) of the previous row and displaced by one position to the right; it corresponds to a back-step in a vertical segment on broken-line at (FIG. 2);

if P(j,m)=01, it decrements by 1 unit the row number in register nr, decrements by 1 unit the row position in register pr, decrements by 1 unit the index value in register m, and in the next step it reads in MEMP the value P(j,m) of previous row displaced by one position to the left: it corresponds to a backstep in an horizontal segment on broken-line at (FIG. 2).

LAR signals to LGC, via connexion CCP, the iteration and when both registers j,m contain value 1. Now MEMC presents the table of all pairs of indexes j,m being coordinates of broken-line at (FIG. 2).

Then, LGC starts the reading phases of MEMC, via wire RWC, and the operation of block ALTE, through the sending of clock signal CCE.

ALTE, shown in dashed line, is a circuit which generates matrix $X_{KM}$ of parameters aligned (also shown in FIG. 2) written also in random access memory MEMM.

ALTE comprises: registers RSj, RSm, RSC which contain addresses for memories MM5, MEMM and MEMC supplied via buses IND5, ADDM, ADDC; an enabling circuit ABL for data transfer from bus 5 to data bus DAM of memory MEMM; a comparator CMPA of data present on bus VPR with those present at the output of register RSm; arithmetic units consisting of a counter CNTA, an adder SMA, a multiplier MLTA, a divider DVA; a control logic LGCA which controls the operations of the arithmetic units for calculating the value of vectors $\bar{e}_m$ to be supplied via bus DAM to memory MEMM, in correspondence of vertical-slope segments of broken-line at (FIG. 2), and which generates the addresses for memory MEMC and reading/writing signal RWM for memory MEMM.

Logic LGCA is synchronized by clock signal CCE generated by control logic LGC.

The implementation of control logic LGCA is not a problem for the technician once known the functions carried out and described in connection with the operation of block ALTE.

ALTE has an iterative operation and one iteration takes place during a period of signal CCE.

At the first pulse of CCE, logic LGCA initializes registers RSj, RSm, RSC at value 1 through a control signal on connexion CKRS and supplies an enabling signal CKAB to gate ABL, so that vector $\bar{e}_1$ read in memory MM5 is written in the first position of memory MEMM as vector $\bar{e}_1$ of matrix $X_{KM}$ and that bus VPR presents the first pair of indexes j, m (pertinent to the second point of broken-line at).

At the next pulses of CCE, LGCA carries out the following operations:

(a) via a control on wire CKCP it enables comparator CMPA which supplies to LGCA via connexion RCP the result of the comparison between index m present on bus VPR and index present at RSm output on bus ADDM;

(b) it supplies to registers RSj, RSm the signal CKRS which determines the updating of the contents with the values j, m present on bus VPR;

(c1) if the result of the comparison carried out by CMPA shows that the value on bus VPR is higher that that at RSm output (it means an horizontal or oblique slope of the at segment joining the two index pairs), LGCA supplies signal CKAB to ABL: then, the new vector present on bus 5 is written in MEMM in the new position addressed by RSm; then LGCA increases by one unit the contents of RSC which addresses the next position of MEMC and sets at 1 counter CNTA via a control signal on connexion CKCN;

(c2) if the result of the comparison carried out by CMPA shows that inputs have the same value (vertical slope of the at segment joining the two index pairs), LGCA sends the reading signal via wire RWM to MEMM and reads again the $\bar{e}_m$ value just written which is supplied to an input of MLTA whose second input presents CNTA contents; via a command on wire CKML, MOLT multiples the two inputs and the result is sent to an input of SOM, whose second input is connected with bus 5 which presents the new vector $e_j$ just read; then it increments by one unit CNTA contents and via a conrol signal on wire CKSM, SMA adds the inputs and the result is supplied to an input of DVA whose second input is connected with the output of CNTA; via a control signal on wire CKDV, DVA divides adder output by the number present at CNTA output; finally, it sends the writing signal via wire RWM to MEMM, and the value at the output of DVA is written in the position addressed by RSm, being unchanged.

In correspondence of a vertical segment of at consisting of N consecutive vectors $\bar{e}_j$, ALTE carries out the arithmetic mean between said N vectors carrying out N consecutive times the operations of point (c2), calculating at each iteration the following expression:

$$(e_m)_n = \frac{[(e_m)_{n-1} \cdot (n-1) + (e_j)_n]}{n}$$

i.e. at the n-th iteration ($1 \leq n \leq N$) it reads in memory MEMM vector $(\bar{e}_m)_{n-1}$ obtained at previous iteration and multiplies it by the number (n−1) of previous iterations; it adds the result obtained to the new $(\bar{e}_j)_n$ read in memory MM5 and divides the result by n and finds the present mean value $(\bar{e}_m)_n$ which is written in the same position of MEMM.

At each CCE pulse, LGC controls whether values j, m present on bus VPR are equal to maximum values J, M present in internal registers: in the positive, it stops signal CCE.

Now, memory MEMM presents matrix $X_{KM}$ of time-aligned parameters of the sentence just spoken: LGC sends the control signal of operation beginning for block MP (FIG. 1), via wire 7′, connected with a wire of bus 7.

Figure 9:
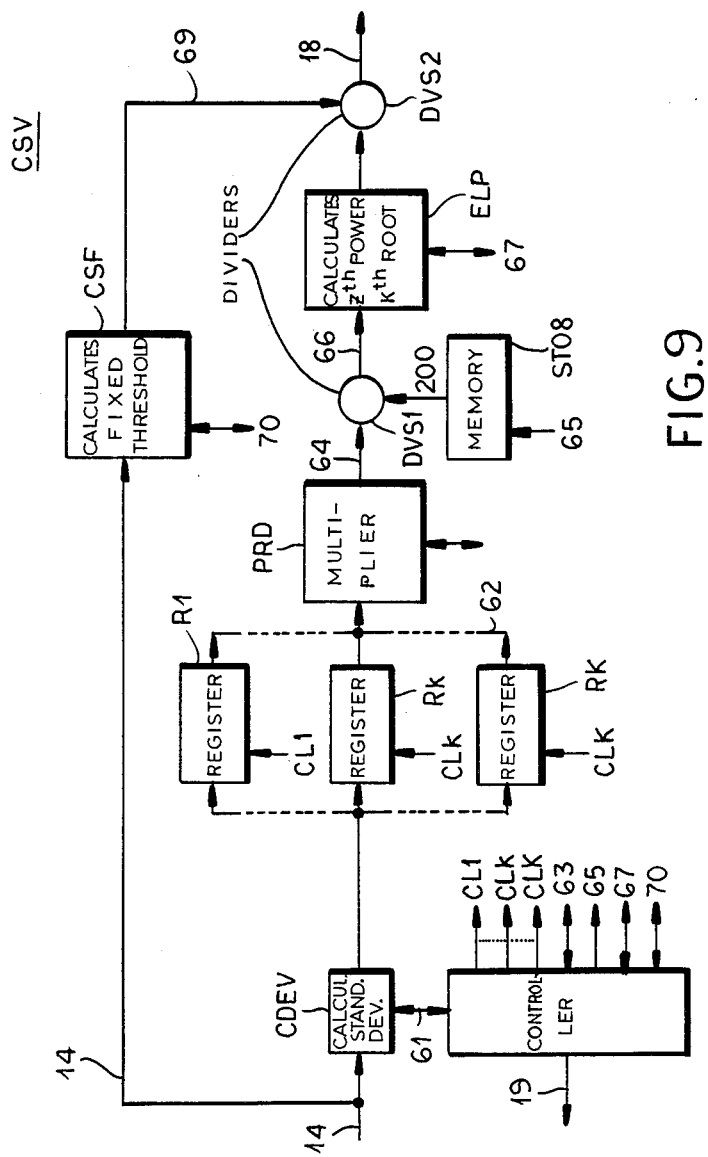
FIG. 9 is a circuit diagram of block CSV of FIG. 1.

FIG. 9 shows the block diagram of block CSV of FIG. 1.

GSI is a circuit which generates control signals for circuits of FIG. 9 and addresses for the reading of memory MEM of FIG. 1. Control signals are asynchronous: at the reception of an operation end signal, GSI generates the control signal for the following operation.

Block GSI implementation is not a problem for a technician once known the functions carried out and described in the following.

CDEV is a typical circuit which calculates the standard deviation $\sigma_k$ of formula (5): now, for each value of k it receives via bus 14 from memory MEM of FIG. 1, addressed by GSI via bus 19, the values $p_{kn}$, a first time for calculating the mean value $\bar{p}_k$, and a second time for calculating the differences $(p_{kn} - \bar{p}_k)$; then, it calculates the square of each difference, adds the squares and calculates the square root of the sum. The value obtained for a given k is the standard deviation $\sigma_k$ which is written in the register of corresponding index $R_k(1 \leq k \leq K)$ via bus 60.

Each operation carried out by CDEV is asynchronously controlled by GSI: via connexion 61, GSI supplies the control signal for a given operation when it receives from CDEV, via connection 61, the signal of previous operation end. GSI also supplies to registers R1, ... Rk, ... RK the control signals CL1, ... CLk, ... CLK for the operations of writing and next reading of values $\sigma_k$.

Once ended the operations of CDEV; GSI controls via bidirectional connexion 63 the operations of block PRD. PRD is a block which calculates the product of formula (4), i.e. the product of values $\sigma_k$, read in registers R1, ... RK upon control signal of GSI and sent in series via bus 62.

The product obtained is emitted via bus 64 to an input of divider DVSI which divides it by quantity $\sigma^K_{NORM}$ ($\sigma_{NORM}$ at k-th power) contained in a read only memory STO8 controlled by GSI via connexion 65. The value obtained is sent via bus 66 to block ELP, controlled by GSI via bidirectional connexion 67. ELP calculates the Z-th power and then the K-th root of value received as input and emits via bus 68 value Y of formula (4).

CSF is a block which calculates the value of fixed threshold Ps of formula (2). It receives from memory MEM (FIG. 1) addressed by GSI the different values of pseudo-events $p_{kn}$ and, for each k, it calculates area $A_k$, keeps stored value $p_{kMAX}$ and calculates quantity $P_{kMAX}/A_k$; then, it calculates the product of all values obtained and sends them on bus 69. The succession of the operations carried out by CSF is asynchronously controlled via bidirectional connexion 70.

DVS2 is a divider which carries out the division between data present on bus 63 and bus 68 and emits via bus 18, towards comparator CMP of FIG. 1, the value of variable threshold Pss. Modifications and variations may be introduced in the realisation of the device herein described without going out from the scope of the invention.

We claim:

1. Device for speaker's verification comprising a circuit extracting characteristic parameters of each sentence, the parameters being energy values associated with speech signal in different frequency bands of the speech band and vector components each related to an interval of the useful time for sentence pronounciation, a circuit calculating the vector average which supplies an average parameter vector, a circuit determining histograms, one for each frequency band, of distribution of the average parameters on many repetitions of the same sentence, a memory of the histograms of each speaker, a circuit calculating the probability that a sentence just spoken belongs to a given speaker, a circuit calculating the probability threshold, a comparison circuit which emits a signal of speaker verified if the probability overcomes the probability threshold value, characterized by the fact that it comprises also:

a circuit determining the real instants of sentence beginning and end (RIF) upstream the circuit extracting the characteristic parameters, which calculates at each interval a long-term power value of the speech signal, long-term indicating a period of a certain number of consecutive intervals, calculates at each interval a short-term weighted power value, short-term being an interval period, obtained as the power product of the speech signal by the ratio between a speech signal power at low frequencies and a speech signal power at high frequencies, compares the long-term power values incremented by a fixed quantity with the short-term weighted power and considers the instant where the second value exceeds the first value as the real instant of sentence beginning if this condition is always verified for a certain number of consecutive intervals (FRAGB, FRAGE) after this instant, repeats these operations for determining the real instant of sentence end analyzing the intervals from the last sentence interval backwards and supplies the parameter extraction circuit only with the intervals comprised between the real instants of sentence beginning and end;

a time alignment circuit (AT), downstream the parameter extraction circuit, which determines a correspondence table, then called alignment path (at), between indexes of vector parameters supplied by the parameter extraction circuit and parameter vectors of a reference sentence, and according to this table it generates a new sequence of aligned parameter vectors whose number corresponds to that of parameter vectors of reference sentence, the vectors of aligned parameters being sent to said average calculating circuit;

being also characterized by the fact that the circuit calculating the probability threshold (CSV) comprises a circuit calculating the product of standard deviations of the distribution histograms of average parameters, said probability threshold being then divided by a corrective factor consisting essentially of the product of standard deviations, obtaining a variable probability threshold.

2. Device as in claim 1, comprising a digital converter of the speech signal for all the time useful for sentence pronounciation, which obtains a set of digital samples to be written in a memory of digital samples (MM1), characterized by the fact that the circuit determining the real instants of sentence beginning and end (RIF) consists of:

a frequency divider (OFR) which divides the sampling frequency of the converter (AD) for the division into time intervals, each interval comprising a certain number of digital samples;

a delay circuit (T1) of a number DN of intervals for the digital samples;

a circuit (PLT) calculating the long-term power associated with the samples received from the delay circuit (T1), and at each interval the logarithm of the mean of the squares of the values received in the last NFN intervals;

a first register (RG1) which receives the long-term power values and emits them when it is enabled by a first enabling signal (22) consisting of the output signal of the frequency divider (OFR) sent through logic gates (34, 35, 37);

a first adder (S1) of the output of the first register (RG1) and a constant vlue (STO1), which sends the result to a second register (RG2) also enabled by the first enabling signal (22);

a circuit calculating the short-term weighted power which consists of a first (PBT1), a second (PBT2) and a third (PBT3) circuit calculating the short-term power which evaluate, at each interval, the logarithm of the mean of the squares of the values received in the last interval, the first circuit (PBT1) receiving the samples, the second circuit (PBT2) the samples filtered in a low-pass filter (FPB), the third circuit (PBT3) the samples filtered in a high-pass filter (FPA), the third circuit output being subtracted from the second circuit output in a subtractor (S2) whose output is added to that of the first circuit (PBT1) in a second adder (S3);

a third register (RG3) which receives the second adder (S3) output and is enabled by a second enabling signal (43) consisting of the output signal of the frequency divider (OFR) sent through a logic gate (42);

a programmable up-down counter (CT1) which counts the intervals, i.e. the periods of the output signal of the frequency divider (OFR), the counter counting up starting from zero during the research of the sentence beginning point, and counting down starting from a maximum interval value during the research of the sentence end point;

a fourth register (RG4) which stores the value of the counter (CT1) output when a third enabling signal (33) is received;

a second counter (CT3), reset by the third enabling signal (33), which counts the periods of the output signal of the frequency divider (OFR), said signal being sent through a logic gate (47) enabled by the third enabling signal (33);

a first comparator (CMP5) which compares the second counter (CT3) output with a constant value consisting of said number of consecutive intervals (FRAGE, FRAGB) and emits an acknownledgment signal (51) when the second counter (CT3) output exceeds the constant value;

a second comparator (CMP1) which compares the outputs of the third (RG3) and second (RG2) register and, when third register output exceeds second register output, it emits said third enabling signal (33) also sent as inhibiting signal to said logic gates (34, 37) which generate the first enabling signal (22);

a third comparator (CMP2) which, when the up/down counter (CT1) output exceeds a constant value (STO6), emits an enabling signal (41) for the logic gate (42) which generates the second enabling signal (43);

a control logic (LC) which, upon reception of a control signal (PU), determines the increasing sequential reading of the digital sample memory (MM1) and the beginning of up counting of said up/down counter (CT1), and upon reception of the acknowledgement signal (51), considers the fourth register (RG4) output value as the real instant of sentence beginning, emits the down counting signal towards the counter (CT1) and determines the decreasing sequential reading of the digital sample memory (MM1) and upon reception of the acknowledgement signal (51) considers the fourth register (RG4) output as the real instant of sentence end.

3. Device as in claim 2, characterized by the fact that the circuit determining the real instant (RIF) consists also of:

a third counter (CT3), reset by the third enabling signal (33), which counts the periods of output signal of the frequency divider (OFR), said signal being sent through the logic gate (47) enabled by the third enabling signal (33);

a fourth comparator (CMP4) which compares the third counter (CT3) output with a constant value, and as far as the constant value is not exceeded, emits a signal (36) which keeps the enablement for the logic gates (34, 35, 37) which emit the first enabling signal (22), after the second comparator (CMP1) has supplied the inhibition signal (33);

a fifth comparator (CMP3) which compares up/down counter output (CT1) with an interval threshold value, the threshold overcoming determining the emission of an error signal (44) towards the control logic which stops operations.

4. Device as in claim 1, characterized by the fact that said time alignment circuit (AT) consists of:

a first memory (MM2) containing the parameter vectors of the reference sentence, each vector being identified by an index m ($1 \leq m \leq M$);

a second memory (MM5) where the extraction parameter circuit (EP) writes the parameter vectors just calculated of a sentence, each vector being identified by an index j ($1 \leq j \leq J$);

a circuit calculating directions (CBC) which receives the vectors from the first and the second memory and, for each pair of indexes (j, m) of the vectors, calculates direction values P(j,m) which indicate from which previous pair of contiguous indexes (j,m−1; j−1,m; j−1,m−1) the minimum of the additions of differences between corresponding components of the vectors comes;

a third memory (MEMP) which contains said direction values P(j,m) in positions where address is given by the values of the corresponding pairs of indexes j, m;

a first addressing and calculating logic (LAR, nr, pr, j, m) which subtracts from the present address the direction value P(j,m) read in the third memory (MEMP), and obtains next address for memory reading, starting from the position corresponding to the pair of indexes J, M; furthermore, it writes sequentially in a fourth memory (MEMC) the addresses generated, the addresses composing said alignment path (at);

a second addressing and calculating logic (ALTE), which addresses in a sequential increasing order the fourth memory (MEMC), reads the pairs of indexes j, m of alignment path (at), uses index j for reading addressing of second memory (MM5) and index m for writing addressing of a fifth memory (MEMM), and compares the values of present and previous index m: if present value exceeds previous value, it writes in the fifth memory the value read in the second memory, if present value is equal to previous value it calculates and writes in the fifth memory the average of all consecutive vectors, read in the second memory, whose index j is given by index pairs having present index m value, the fifth memory (MEMM) containing then the sequence of vectors of parameters aligned;

a logic (LGC) controlling the operation of time alignment circuit (AT).

5. Device as in claim 4, characterized by the fact that said circuit calculating directions (CBC) consists of two cascaded configurations of equal circuits, called cells (C(−R), ... CO, ... CR), identified by odd and even indexes r($-R \leq r \leq R$), whose value is the difference between the indexes of vectors coming from said first (MM2) and second (MM5) memory, each cell comprising:

a fifth register (REG5) which receives from previous cell of the same configuration the vectors of parameters coming from second memory (MM5) and emits them towards the following cell of the same configuration;

a sixth register (REG6) which receives from the following cell of the same configuration the vectors of parameters coming from the first memory (MM2) and emits them towards the previous cell of the same configuration;

a distance calculation circuit (CDS) which calculates the addition of the differences between homologous components of the vectors present at the outputs of the fifth (REG5) and sixth (REG6) register;

a circuit calculating accumulated distances (CDA) which comprises: a comparator which verifies the minimum between three values consisting of a value of accumulated distance obtained at previous calculation and temporarily stored in a seventh register (REG7), values of accumulated distance present at the output of circuits calculating accumulated distances (CDA) of the two cells of contiguous index pertaining to the other cascaded configuration, and emits an indication related to the minimum value out of the three values, the indication being a direction value P(j,m); an adder of the distance value supplied by the distance calculation circuit (CDS) and the minimum of the three values, the adder emitting the accumulated distance values sent to the inuts of the corresponding circuits of the contiguous cells of the other cascaded configuration;

an enabling circuit (TFL) which enables the operation of the circuit calculating accumulated distance (CDA) and of the seventh register (REG7) when it verifies the contemporary presence of data at fifth (REG5) and sixth (REG6) register outputs.

6. Device as in claim 1, characterized by the fact that the circuit calculating the probability threshold (CSV) consists of:

a circuit (CDEV) calculating the standard deviation of each speaker histogram received from histogram memory (MEM);

registers (R1, ... RK), one for each histogram, which temporarily store the corresponding value of standard deviation supplied by the circuit calculating the standard deviation;

a circuit (PRD) calculating the product of the values present in said registers (R1, ... RK);

a first divider (DVS1) which divides the values received from the circuit calculating the product by a constant normalizing value ($\sigma^K_{NORM}$);

a power raising circuit (ELP) which calculates the Z-th power and then the K-th root of the value received from the first divider (DVS1), where Z is a fixed exponential factor and K is the histogram number;

a second divider (DVS2) which divides the probability threshold by a value present at the output of the power raising circuit (ELP) obtaining the variable probability threshold;

a circuit (GSI) generating control and synchronisation signals.

7. A device for speaker's verification comprising:

transducing means for converting a speech signal representing a spoken phrase to an electrical signal;

digital connector means coupled to said transducing means for converting said electrical signal to digitized data;

a first circuit, coupled to an output of said digital converter means, for determining real instants of phrase beginning and phrase end of said spoken phrase, which calculates at each interval a long-term power value of said speech signal, long-term indicating a period of a certain number of consecutive intervals, calculates at each interval a short-term weighted power value, short-term being an interval period, obtained as the power product of said speech signal by the ratio between a speech signal power at low frequencies and a speech signal power at high frequencies, compares said long-term power values incremented by a fixed quantity with said short-term weighted power and considers the instant where said short-term value exceeds said long-term value as said real instant of phrase beginning if this condition is always verified for a certain number of consecutive intervals after this instant, repeats these operations for determining said real instant of sentence end analyzing said intervals from said sentence interval backwards;

parameter extraction circuit coupled to output of said first circuit, said first circuit supplying said extraction circuit with said digitized data only within said intervals comprised between said real instant of said phrase beginning and said real instant of phrase end, for extracting characteristic parameter vectors of said speech signal, said characteristic parameter vectors being energy values associated with said speech signal in different frequency bands, each related to an interval of useful time for phrase pronunciation;

a first memory means for storing plurality characteristic parameter vectors of reference phrase, each vector being indentified by an index m ($1 < m < M$);

time alignment circuit, coupled to output of said parameter extraction circuit and said first memory means, which determines a correspondence table representing an alignment path, between indexes of said vector components supplied by said parameter extracton circuit and said characteristic parameter vectors of said reference sentence, and generates a sequence of aligned parameter vectors whose number corresponds to that of said characteristic parameter vectors of said reference sentence, calculating circuit, coupled to output of said time alignment circuit, said time alignment circuit supplies to said calculating circuit said alignment parameters vectors for calculating vector average, histogram circuit, coupled to output of said calculating circuit for determining histograms, one for each frequency band, of distribution of average of said aligned vectors on many repetitions of said phrase, second memory means coupled to output of said histogram circuit for storing a plurality of histograms of each speaker's histogram, probability circuit, coupled to output of said calculating circuit and coupled to said second memory means, for calculating the probability that a phrase just spoken belongs to a given speaker, probability threshold circuit, coupled to said second memory means, for calculating a probability threshold comprising product of the standard deviations of said histograms of said average of said characteristic parameter vectors, said probability threshold being then divided by a corrective factor consisting essentially of said product of standard deviations, obtaining a variable probability threshold, a comparison circuit coupled to outputs of said probability circuit and said probability threshold circuit, which emits verification signal if said probability overcomes said probability threshold value.

8. Device as in claim 1, wherein said first circuit consists of:

a third memory means for storing digital samples of said speech signal;

low pass filtering means coupled to said third memory means for separating out high frequency components of said digital samples;

high pass filtering means coupled to said third memory means for separating out low frequency components of said samples;

short term weight power calculating circuit, calculating said short term power, coupled to said first memory means, said low pass filtering means and said high pass filtering means comprising:

first subcircuit, coupled to said third memory means, calculating said short term power evaluated, at each interval the logarithm of the means of values received in previous interval, second subcircuit, coupled to said low pass filtering means, calculating said short term power evaluated at each interval, the logarithm of the mean of values received in previous intervals, third subcircuit coupled to said high-pass filtering means, calculating said short term power which evaluate at each interval the logarithm of the mean of the squares of values received in previous intervals, subtracting means coupled to said third subcircuit and said second subcircuit, for subtracting third subcircuit for said second subcircuit, first adding means coupled to said subtracting means and said first subtracting for adding said first subcircuit with said subtracting means;

first register, coupled and said second adding means;

delay circuit, coupled to said second adding means, of a plurality of intervals for said digital samples;

long-term power calculating circuit, coupled to said delay circuit, calculating long-term power values associated with said digital samples received from said delay circuit, and at each interval the logarithm of the mean of the square of values received in the last plurality of intervals;

second register coupled to said long-term power calculating circuit, which receives said long-term power values;

fourth memory means for storing a first constant value;

second adder coupled to the output of said second register and said fourth memory means, for adding the output of said fourth memory means with said first constant value stored in said fourth memory means generating a summation signal;

a third register coupled to said second adder which receives said summation signal;

first comparator coupled to an output of said first register and an output of said third register which compares said output of said first register and said output of said third register and when said first register output exceeds said third register output, said first comparator emits first enabling signal;

frequency divider which divides a sampling frequency of said digital convector for the division into time intervals, each interval comprising a plurality of digital samples said frequency divider emits second enabling signal;

first programmable up-down counter, coupled to said frequency divider, which counts the intervals of said frequency divider, said first programmable up-down counter counting up starting from zero during research of said phrase beginners point, and counting down starting from a maximum interval value during research of said phrase endpoint;

fifth memory means for storing second constant value;

second comparator, coupled to said programmable up-down counter and said fifth memory means, when output of said up-down counter exceed said second constant value of said fifth memory means, emits a third enabling signal first gatings means coupled to said first enabling signal and said second enabling signal, performing a logical AND function;

second counter coupled to said first gating means and said first enabling signal, said second counter is reset by said first enabling signal, which counts periods of said second enabling signal;

sixth memory means storing third constant value;

third comparator coupled to said second counter and said sixth memory means, which compares an output of said second counter with said third constant value of said sixth memory means and emits an acknowledgement signal when said second counter exceeds said third constant value;

fourth register coupled to said first up-down counter and said first enabling signal and stores value of said first up-down counter when said first enabling signal is received;

control logic means coupled to said fourth register, said first programmable up-down counter and said third comparator, upon reception of a control signal, determines an increasing sequential reading of said third memory means and a beginning of up counting of said first up-down counter, and upon reception of said acknowledgement signal, said fourth register contains a value of said real instant of phrase beginning, emits down counting signal to said first programmable up-down counter and determines a decreasing sequential reading of said third memory means and upon reception of said acknowledgement signal said fourth register contains a value of said real instant of phrase end; and first logic enabling means, coupled to said first enabling signal, emitting a fourth enabling signal for enabling said second register and said third register, said third enabling signal, coupled to said first subcircuit, said second subcircuit, said third subcircuit, and said long-term power calculating circuit enabling said first subcircuit, said second subcircuit, said third subcircuit and said long-term power calculating circuit, and a logic means coupled to said third enabling signal and said first enabling signal comprising an AND gate for emitting a fifth enabling signal for said first register.

9. Device as in claim 8 consisting of:

third counter coupled to said first gating means and said first enabling signal, said third counter is reset by said first enabling signal, which counts said periods of said second enabling signal;

seventh memory means for storing fourth constant value;

fourth comparator, coupled to said third counter and said seventh memory means, which compares said an output of said third counter with said fourth constant value of said seventh memory means and emits a sixth enabling signal when said fourth value exceeds said output of said third counter, and said sixth enabling signal is coupled to said first logic enabling means which maintains said fourth enabling signal active after said first enabling signal has inhibited said first logic enabling means upon receipt of said sixth enabling signal;

eighth memory means for storing fifth constant value, referred to as an interval threshold value;

fifth comparator, coupled to said first up-down counter and said eigth memory means, said fifth comparator emits an error signal when said up-down counter exceeds said interval threshold value; and said control logic means, coupled to said fourth comparator, stops operation upon receipt of said error signal.

10. Device in claim 8 where said time alignment circuit consists of:

a time alignment logic control circuit for controlling the operation of said time alignment circuit;

ninth memory means, coupled to said parameter extractive circuit for storing said characteristic parameter vectors of said speech signal, each vector being identified by an index $j(1<j<J)$;

direction calculating circuit, coupled to said first memory means and said ninth memory means, for each pair of said indices (j, m) of said characteristic parameter vector of said speech signal and said characteristic parameter vectors of said reference phrase, calculates direction values refer to P(j, m) which indicate from which previous pair of contiguous indices (j, m−1; j−1, m; j−1, m−1) minimum of additions of differences between corresponding components of said characteristic parameter vectors comes;

tenth memory means coupled to said direction calculation circuit for storing said direction values (P(j, m)) in locations where addresses are given by values of corresponding pairs of indices j, m;

eleventh memory means for storing values comprises said alignment path;

first addressing calculating logic circuit coupled to said tenth memory means, and said which eleventh memory means, subtracts from a present address said direction value (P(j, m)) of said tenth memory means and obtain next address to be read from said tenth memory means, starting from a position corresponding to a pair of indices j, m, said first addressing calculations logic circuit writes said address to said eleventh memory means, said address comprises said alignment path;

twelfth memory means for storing said aligned parameter vectors;

second addressing calculating logic circuit coupled to said ninth memory means, coupled to said eleventh memory means, and coupled to said twelfth memory means, which reads in a sequential increasing order said eleventh memory memory means, reads pairs of indices j, m of said alignment path, uses index j of reading address of said ninth memory means and index m for writing address of said twelfth memory means, and compares values of present and previous index m, if said present value exceed said previous value, said second addressiing logic circuit writes in said twelfth memory means value read in said ninth memory means, if said present value is equal to said previous value said second addressing calculating logic circuit calculates and writes in said twelfth memory an average of all consecutive vectors, read in said first memory means, whose index j is given by index pairs having said present index m value.

11. Device in claim 10 in which said direction calculating circuit consisting of:

a first cascaded configuration of a plurality equal circuits and a second cascaded configuration of a plurality of equal circuits, referred to as cells (C(−R), ... (0 ... (R) identified by odd and even indices r (−R≦r≦R), said index is a difference between index of said ninth memory means and index of said first memory means, each cell comprising:

fifth register which receives from previous cell of said first cascaded configuration said parameters vectors received from said ninth memory (MM5) and emits said parameter vectors towards the following in said first cascaded configuration;

sixth register which receives from the following said second cascaded configuration said parameters vectors received from said first memory and emits said parameter vectors towards the previous cell in said second cascaded configuration;

distance calculation circuit coupled to said fifth register and said sixth register which calculates the addition of the differences between homologous components of the vectors present at outputs of said fifth and said sixth register, emitting a distance value logic enabling circuit coupled to said fifth register and said sixth register which generates a logic enabling signal when it verifies the contemporary presence of data at said fifth register and said sixth register;

accumulating circuit coupled to said distance calculation circuit and said logic enabling circuit calculating accumulated distances which comprises:

accumulating a sixth comparator which verifies the minimum between three values consisting of a value of accumulated distance obtained at previous calculation and temporarily stored in a seventh register, values of accumulated distance present at the output of circuits calculating accumulated distances of two cells of contiguous index pertaining to the other cascaded configuration, and emits a direction value referred to as P(j, m) related to the minimum value out of the three values; an adder of said distance value supplied by said distance calculation circuit and the minimum of three values, an adder emitting accumulated distance values sent to the inputs of the corresponding circuits of the contiguous cells of the other cascaded configuration.

12. Device in claim 8 wherein said probability threshold circuit consists of:

a generating circuiting for generating the control and synchronism signals;

standard deviation circuit coupled to said second memory means and said generating circuit calculating standard deviation of speakers' histograms received from said second memory means;

plurality of registers coupled to said standard deviation circuit and said generating circuit one register for each histogram, which temporarily store the corresponding value of said standard deviation supplied by said standard deviation circuit;

product circuit coupled to said plurality of registers for calculating and said generating circuit the product of values present in said plurality of registers;

first divider coupled to said product circuit, and said generating circuit which divides values received from said product circuit by a constant normalizing value;

power raising circuit coupled to said first divider, where Z is a fixed exponential factor and K is a histogram number, which calculates said Z.th power and then said K.th root of values received from said first divider;

fixed threshold calculating circuit coupled to said second memory for calculating a fixed threshold probability;

second divider coupled to said power raising circuit and said fixed threshold calculating circuit, which divides output from said fixed threshold calculating circuit by output of said power raising circuit obtaining said variable probability threshold.

* * * * *